US008427358B1

(12) United States Patent
Doerry

(10) Patent No.: US 8,427,358 B1
(45) Date of Patent: Apr. 23, 2013

(54) MITIGATING ILLUMINATION GRADIENTS IN A SAR IMAGE BASED ON THE IMAGE DATA AND ANTENNA BEAM PATTERN

(75) Inventor: Armin W. Doerry, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1434 days.

(21) Appl. No.: 11/566,531

(22) Filed: Dec. 4, 2006

(51) Int. Cl.
*G01S 13/00* (2006.01)
(52) U.S. Cl.
USPC ........................................ 342/25 R
(58) Field of Classification Search ............ 342/25
See application file for complete search history.

(56) References Cited

U.S. PATENT DOCUMENTS

| 4,771,287 | A | * | 9/1988 | Mims ........................... 342/25 A |
| H910 | H | * | 4/1991 | Hindenach .................... 342/25 F |
| 5,166,688 | A | | 11/1992 | Moreira |
| 2005/0280571 | A1 | * | 12/2005 | Abatzoglou et al. ........ 342/25 B |
| 2006/0033659 | A1 | * | 2/2006 | Strickland ..................... 342/372 |

OTHER PUBLICATIONS

Fred M. Dickey, John M. DeLaurentis, Armin W. Doerry, "A SAR imaging model for large-scale atmospheric inhomogeneities", SPIE 2004 Defense & Security Symposium, Radar Sensor Technology IX, vol. 5410A, Orlando FL, Apr. 12-16, 2004.
S. N. Madsen, "Estimating the Doppler centroid of SAR data", IEEE Transactions on Aerospace and Electronic Systems, vol. 25, Issue 2, pp. 134-140, Mar. 1989.
Weidong Yu, Zhaoda Zhu, "Comparison of Doppler centroid estimation methods in SAR", Proceedings of the IEEE 1997 National Aerospace and Electronics Conference, NAECON 1997, vol. 2, pp. 1015-1018, Jul. 14-18, 1997.
M. De Stefano, A.M. Guarnieri, "Robust Doppler centroid estimate for ERS and ENVISAT", Proceedings of the IEEE International 2003 Geoscience and Remote Sensing Symposium, IGARSS '03, vol. 6, pp. 4062-4064, Jul. 21-25, 2003.
M. Zink, R. Bamler, "X-SAR radiometric calibration and data quality", IEEE Transactions on Geoscience and Remote Sensing, vol. 33, Issue 4, pp. 840-847, Jul. 1995.
L. A. Frulla, J.A. Milovich, H. Karszenbaum, D.A. Gagliardini, "Radiometric corrections and calibration of SAR images", 1998 IEEE International Geoscience and Remote Sensing Symposium Proceedings, IGARSS '98, vol. 2, pp. 1147-1149, Jul. 6-10, 1998.
B. L. Burns, J. T. Cordaro, "SAR image formation algorithm that compensates for the spatially variant effects of antenna motion", SPIE Proceedings, vol. 2230, SPIE's International Symposium on Optical Engineering in Aerospace Sensing, Orlando, FL, Apr. 4-8, 1994.
I. J. LaHaie, S. A. Rice, "Antenna-pattern correction for near-field-to-far field RCS transformation of 1D linear SAR measurements", IEEE Antennas and Propagation Magazine, vol. 46, Issue 4, pp. 177-183, Aug. 2004.

* cited by examiner

*Primary Examiner* — Timothy A Brainard
(74) *Attorney, Agent, or Firm* — Scott B. Stahl

(57) ABSTRACT

Illumination gradients in a synthetic aperture radar (SAR) image of a target can be mitigated by determining a correction for pixel values associated with the SAR image. This correction is determined based on information indicative of a beam pattern used by a SAR antenna apparatus to illuminate the target, and also based on the pixel values associated with the SAR image. The correction is applied to the pixel values associated with the SAR image to produce corrected pixel values that define a corrected SAR image.

20 Claims, 3 Drawing Sheets

MITIGATING ILLUMINATION GRADIENTS IN A SAR IMAGE BASED ON THE IMAGE DATA AND ANTENNA BEAM PATTERN

This invention was developed under Contract DE-AC04-94AL85000 between Sandia Corporation and the U.S. Department of Energy. The U.S. Government has certain rights in this invention.

FIELD OF THE INVENTION

The invention relates generally to Synthetic Aperture Radar (SAR) and, more particularly, to processing SAR images.

BACKGROUND OF THE INVENTION

Conventional Synthetic Aperture Radar (SAR) processing effectively forms a synthetic beam pattern that offers azimuth resolution much finer than the actual beamwidth of the antenna. Both the actual aperture (antenna) beam and the synthetic aperture beam constitute spatial filters. Proper target scene selection requires these spatial filters to be properly pointed and aligned in the desired direction. That is, the SAR scene of interest must be adequately illuminated by the actual antenna beam.

Furthermore, the actual antenna beam pattern rarely offers uniform illumination over its nominal width, typically taken as the angular region between its −3 dB illumination directions. Consequently, SAR images may show a reduction in brightness towards the edges of the scene being imaged. This is exacerbated whenever imaged scenes are large compared with the illumination footprint, such as at near ranges or coarse resolutions. While careful antenna calibration and alignment allows compensating for antenna beam roll-off with an inverse of the relative two-way gain function, any unexpected illumination gradients from other system sources will be left unmitigated. For example, any misalignment of the synthetic beam from the actual beam will cause unexpected brightness gradients across the image. Such misalignment might be due to factors such as the mounting of the antenna, the environment of the antenna, motion measurement errors affecting the synthetic beam orientation, near-range operation, wide scenes, or inadequate antenna pointing accuracy. Illumination anomalies are also known to be caused by atmospheric phenomena.

A number of conventional algorithms attempt to characterize from the data the synthetic beam direction in relation to the actual beam direction. These are generally referred to as Doppler Centroid Estimation algorithms. Generally, they are not concerned with beam shape beyond using it to calculate the Doppler frequency at the beam center. This is required to process the data correctly, especially for orbital systems.

Conventional techniques that correct for antenna illumination patterns in SAR images are often referred to as Radiometric Calibration techniques. When these techniques are used in orbital SAR systems, the elevation pattern is usually a significant concern, due to the favored processing methods and typically larger range swaths associated with orbital systems. In any event, the methodology is typically designed to ensure that any measured pattern matches the theoretical pattern, with the theoretical pattern being used for purposes of correcting the larger data set with a single calibration correction.

Some conventional techniques compensate for the antenna azimuth beam pattern during image formation processing and, in some instances, the beam pattern must be known before processing.

It is desirable in view of the foregoing to provide for improvements in mitigating illumination gradients in SAR images.

DETAILED DESCRIPTION

Exemplary embodiments of the invention mitigate illumination gradients (including illumination roll-off effects) in a SAR image by fitting an antenna beam pattern model to an illumination profile of the image, and compensating the pixel brightness with an inverse relative gain function that is determined based on the model-fitting. This is accomplished without a detailed antenna pattern calibration, and provides some tolerance of drift in the antenna beam alignments.

In some embodiments, a SAR image is characterized by an associated two-dimensional pixel value array. The columns and rows of the two-dimensional pixel value array respectively correspond to range and azimuth directions of the SAR image. Some embodiments use a non-linear filter in the range direction of the SAR image to produce the illumination profile. For each azimuth position in the azimuth direction of the SAR image, the filter determines a representative pixel value, also referred to herein as a profile pixel value, for the column of range pixel values associated with that azimuth position. A profile pixel value is thus determined for each column in the aforementioned two-dimensional pixel value array.

When determining the illumination profile of the SAR image, some embodiments attempt to avoid undue influence from bright target points or shadow regions. For example, for each column, the median pixel value associated with that column can be taken as the profile pixel value for that column. The median pixel values provide an illumination profile 11, an example of which is shown graphically in FIG. 1.

Figure 1:
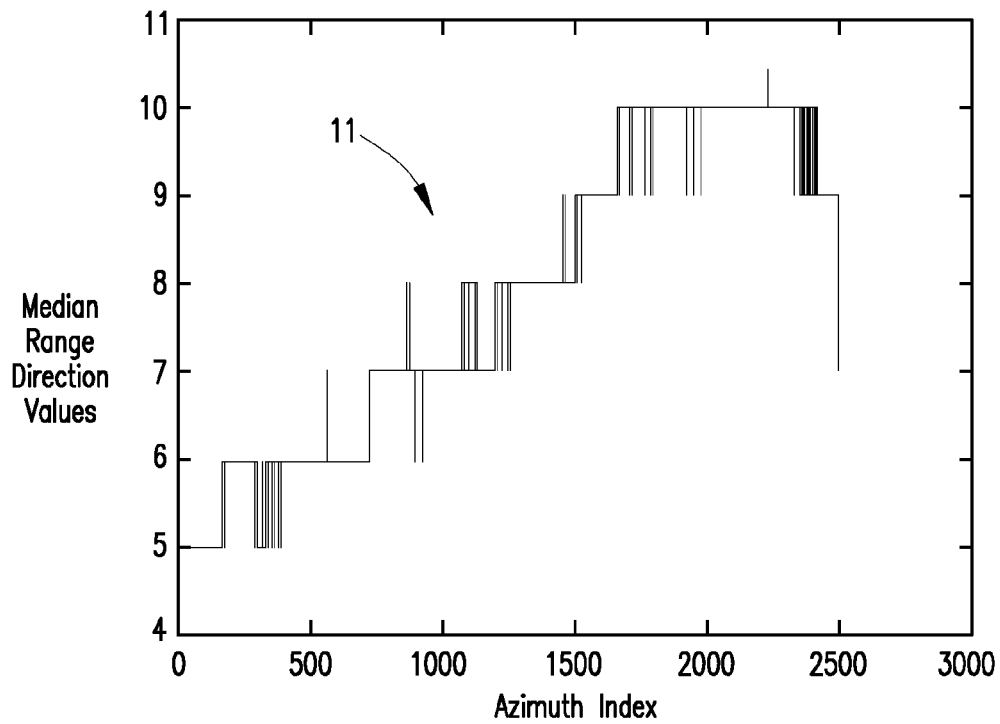
FIG. 1 graphically illustrates an illumination profile of a SAR image according to exemplary embodiments of the invention.
Figure 2:
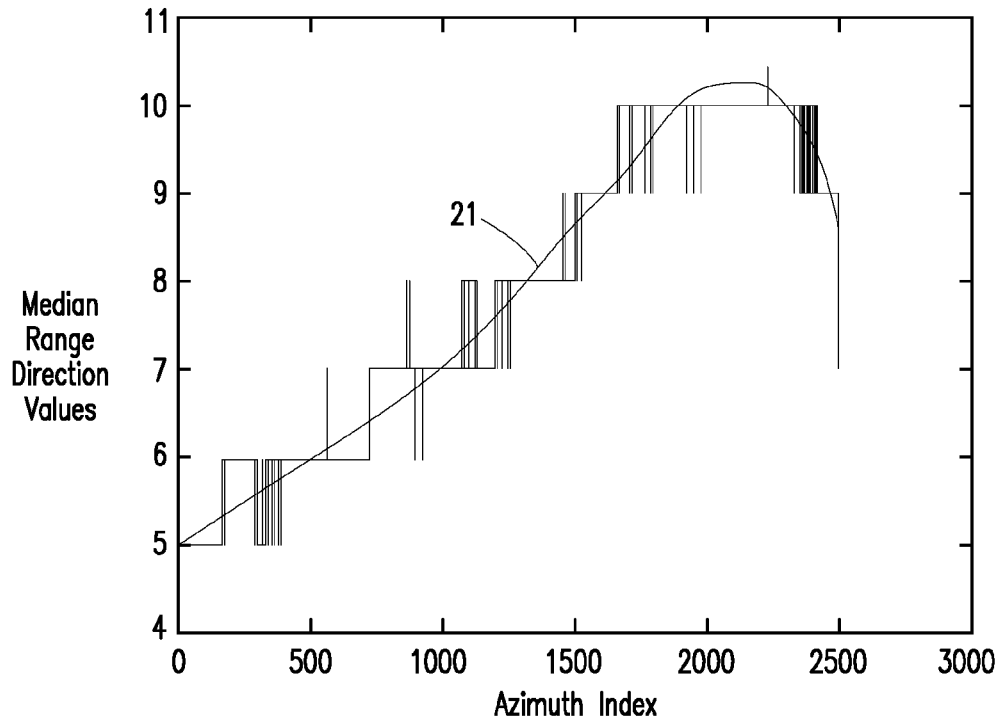
FIG. 2 graphically illustrates a vector produced by fitting the illumination profile of FIG. 1 to a representation of a beam pattern of a SAR antenna apparatus, according to exemplary embodiments of the invention.

The median pixel value data of FIG. 1 is then smoothed by fitting it to a representation of the antenna beam pattern. If the antenna beam pattern is known, then the representation that defines that pattern can be used directly. Alternatively, any suitable polynomial representation that approximates the antenna beam pattern can be used. Such an approximation can be used, for example, in situations where the antenna beam pattern is not known. An antenna beam pattern will usually exhibit a strong quadratic behavior in the neighborhood of its peak response. Subtle variations from the quadratic behavior may be captured with models that use a few higher-order terms. Various embodiments therefore use various $3^{rd}$ or $4^{th}$ order polynomial representations. For example, FIG. 2 graphically illustrates the median value data of FIG. 1 fitted to a $4^{th}$ order polynomial representation of the antenna beam pattern. The resulting curve 21 is a data vector or array. In some embodiments, the curve fitting illustrated in FIG. 2 is accomplished using conventional minimum-mean-squared-error techniques.

Figure 3:
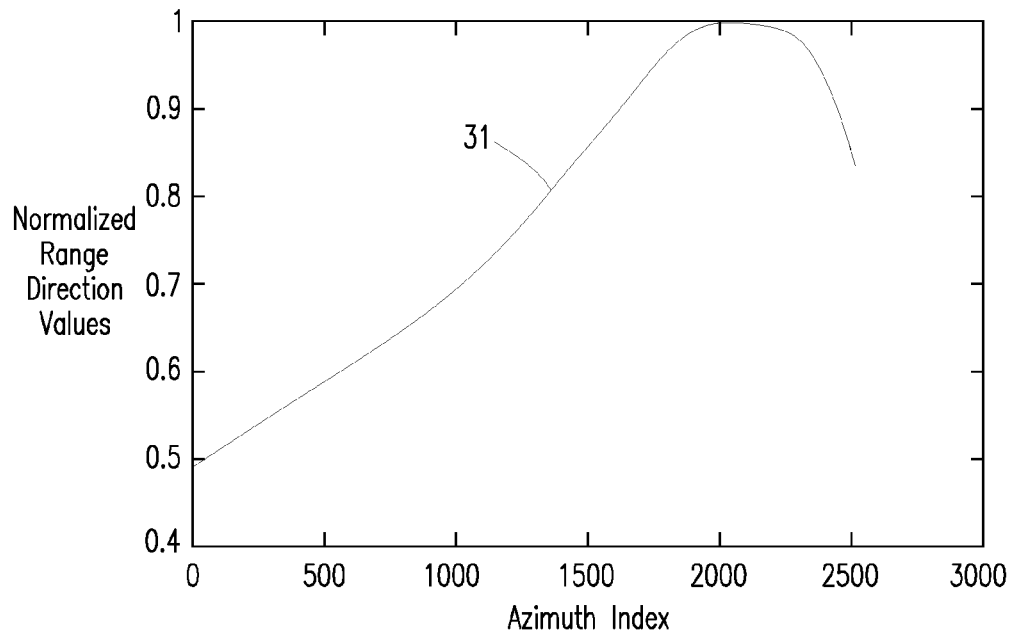
FIG. 3 graphically illustrates a normalized vector produced by normalizing the vector of FIG. 2 according to exemplary embodiments of the invention.
Figure 4:
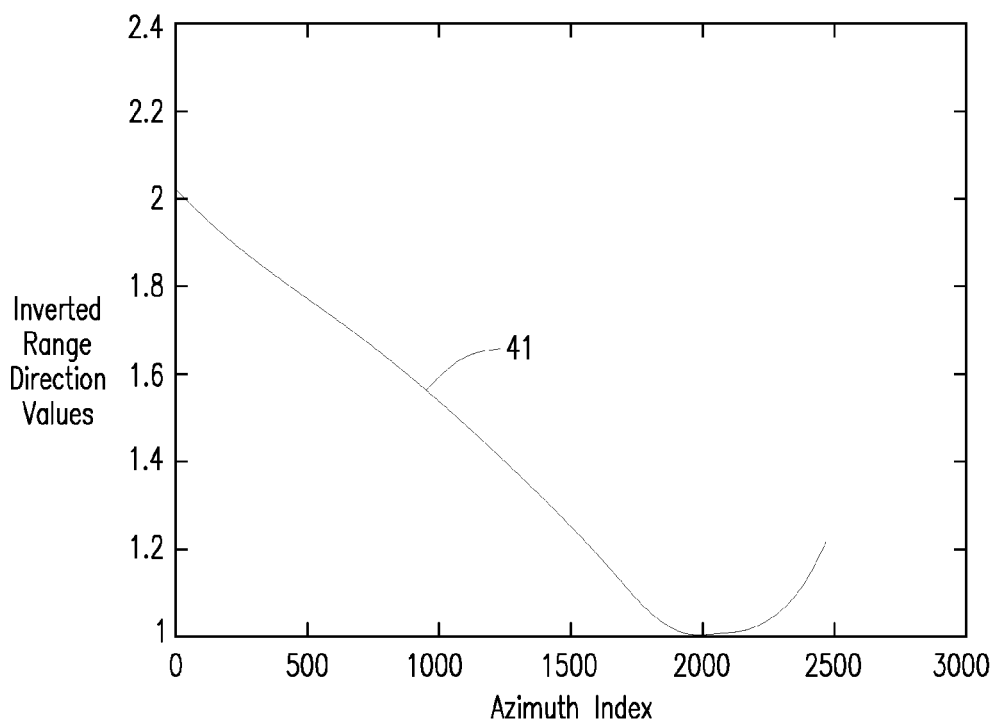
FIG. 4 graphically illustrates an illumination correction vector produced by inverting the normalized vector of FIG. 3 according to exemplary embodiments of the invention.

The vector 21 can be normalized to unit amplitude by dividing each element of the vector by the vector's maximum value. The result of this normalization is shown as a normalized vector 31 in FIG. 3. The inverse of the vector 31 can then be calculated by dividing each normalized vector value from FIG. 3 into one, that is, by replacing each vector value of FIG. 3 by its reciprocal value. This inversion operation produces pixel correction values that define an illumination correction vector, as shown at 41 in FIG. 4.

In each row of the aforementioned original two-dimensional pixel array that constitutes the original SAR image, the pixel value at each azimuth position can be corrected by multiplication with the respectively corresponding pixel correction value of the illumination correction vector 41. The resulting corrected pixel values define a corrected SAR image. This pixel value correction operation can mitigate illumination gradients present in the original SAR image.

In some embodiments, the pixel value correction operation is applied to the SAR image after other brightness corrections (e.g. lookup tables, gamma corrections, etc.) have been applied. Some embodiments average illumination correction vectors 41 over several SAR images to mitigate peculiarities resulting from anomalies within a single image.

Note that the polynomial antenna beam pattern representation of FIG. 2 exhibits an azimuth-oriented illumination gradient. Some embodiments utilize an antenna beam pattern representation that exhibits a range-oriented illumination gradient.

Figure 5:
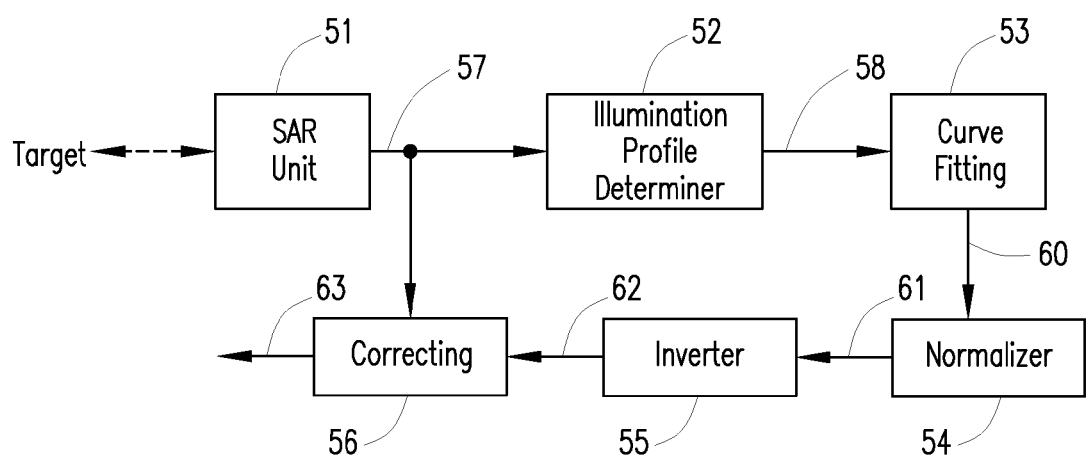
FIG. 5 diagrammatically illustrates a SAR system according to exemplary embodiments of the invention.

FIG. 5 diagrammatically illustrates a SAR system according to exemplary embodiments of the invention. In some embodiments, the system of FIG. 5 is capable of performing operations described above with respect to FIGS. 1-4. The system includes a SAR data collection unit 51 coupled to a pixel corrector designated generally at 52-56. The SAR data collection unit 51 uses conventional techniques to produce at 57 pixel value arrays that define respective SAR images. An illumination profile determiner 52 coupled to the SAR data collection unit 51 is configured to determine for each pixel value array at 57 a corresponding set of profile pixel values. Each set of profile pixel values defines an illumination profile 58 (e.g., the illumination profile at 11 in FIG. 1) of the corresponding SAR image. A curve fitting unit 53 coupled to the illumination profile determiner 52 is configured to fit each illumination profile 58 to a suitable representation of the actual antenna beam pattern used by the SAR data collection unit 51. The curve-fitting unit 53 produces a vector 60 of curve-fitted pixel values (e.g., the vector at 21 in FIG. 2). The curve-fitting unit 53 is coupled to a normalizer 54 that is configured to normalize the curve-fitted pixel values of the vector 60. The resulting normalized vector 61 (e.g., the vector at 31 in FIG. 3) is input to an inverter 55 configured to invert the normalized pixel values of the vector 61 to produce a corresponding illumination correction vector 62 (e.g., the illumination correction vector 41 of FIG. 4). A correcting unit 56 coupled to the inverter 55 and the SAR data collection unit 51 is configured to combine each illumination correction vector at 62 with its respectively corresponding SAR image at 57, for example, in the manner described above with respect to FIG. 4. The resulting corrected SAR image is designated generally at 63.

Although exemplary embodiments of the invention have been described above in detail, this does not limit the scope of the invention, which can be practiced in a variety of embodiments.

What is claimed is:

1. A method for mitigating illumination gradients in a synthetic aperture radar (SAR) image, comprising:
   providing pixel values associated with a SAR image of a target;
   determining a correction for the pixel values based on information indicative of a beam pattern used by a SAR antenna apparatus to illuminate the target, and also based on the pixel values; and
   applying said correction to the pixel values to produce corrected pixel values.

2. The method of claim 1, wherein the beam pattern information represents an actual beam pattern used to illuminate the target.

3. The method of claim 1, wherein the beam pattern information represents an approximation of an actual beam pattern used to illuminate the target.

4. The method of claim 1, wherein said determining includes providing, based on said first-mentioned pixel values, profile pixel values that define an illumination profile of the SAR image, and wherein said determining includes fitting the profile pixel values to a mathematical representation of said beam pattern to produce fitted pixel values, and including using the fitted pixel values together with said first-mentioned pixel values to produce the corrected pixel values.

5. The method of claim 4, wherein said fitting includes minimum mean-squared error fitting.

6. The method of claim 4, wherein said determining includes applying a pixel value filter operation to said first-mentioned pixel values to produce said profile pixel values.

7. The method of claim 6, wherein said determining includes producing intermediate pixel values based on the fitted pixel values, and wherein said producing includes normalizing pixel values and inverting pixel values.

8. The method of claim 7, wherein said first-mentioned applying includes combining said intermediate pixel values with said first-mentioned pixel values to produce the corrected pixel values.

9. The method of claim 6, wherein the pixel value filter operation is a median filter operation, and the profile pixel values are median values associated with respective groups of said first-mentioned pixel values.

10. The method of claim 6, wherein said first-mentioned pixel values define a pixel value array having range and azimuth dimensions, wherein said last-mentioned applying includes applying the pixel value filter operation with respect to one of said dimensions, and wherein said mathematical representation has associated therewith an illumination gradient that is oriented in the other of said dimensions.

11. The method of claim 10, wherein said one dimension is said range dimension and said other dimension is said azimuth dimension.

12. The method of claim 6, wherein said first-mentioned pixel values define a pixel value array having range and azimuth dimensions, wherein said last-mentioned applying includes applying the pixel value filter operation with respect to one of said dimensions, and wherein said first-mentioned applying includes applying said correction with respect to the other of said dimensions.

13. The method of claim 12, wherein said one dimension is said first dimension and said other dimension is said second dimension.

14. The method of claim 4, wherein said determining includes producing intermediate pixel values based on the fitted pixel values, and wherein said producing includes normalizing pixel values and inverting pixel values.

15. The method of claim 14, wherein said applying includes combining said intermediate pixel values with said first-mentioned pixel values to produce the corrected pixel values.

16. An apparatus for mitigating illumination gradients in a synthetic aperture radar (SAR) image, comprising:
   an input for receiving pixel values associated with a SAR image of a target;
   a corrector coupled to said input and configured to determine a correction for said pixel values based on information indicative of a beam pattern used by a SAR antenna apparatus to illuminate the target, and also based on the pixel values; and
   said corrector configured to apply said correction to the pixel values to produce corrected pixel values.

17. The apparatus of claim 16, wherein said corrector is configured to provide, based on said first-mentioned pixel values, profile pixel values that define an illumination profile of the SAR image, wherein said corrector is further configured to fit the profile pixel values to a mathematical representation of said beam pattern to produce fitted pixel values, and wherein said corrector is further configured to use said fitted pixel values together with said first-mentioned pixel values to produce said corrected pixel values.

18. The apparatus of claim 17, wherein said corrector is configured for production of intermediate pixel values based on said fitted pixel values, and wherein said production includes normalizing pixel values and inverting pixel values.

19. The apparatus of claim 18, wherein said corrector is configured to combine said intermediate pixel values with said first-mentioned pixel values to produce said corrected pixel values.

20. A SAR system, comprising:
   a SAR receiver configured to receive SAR signals and produce in response thereto pixel values associated with a SAR image of a target;
   an apparatus for mitigating illumination gradients in said SAR image, including an input coupled to said SAR receiver, and a corrector coupled to said input;
   said corrector configured to determine a correction for said pixel values based on information indicative of a beam pattern used by a SAR antenna apparatus to illuminate the target, and also based on the pixel values; and
   said corrector configured to apply said correction to the pixel values to produce corrected pixel values.

* * * * *